Nov. 10, 1959   O. H. HAMM   2,912,056
AUTOMOTIVE VEHICLE ANTI-SKID DEVICE
Filed Aug. 22, 1956   3 Sheets-Sheet 1
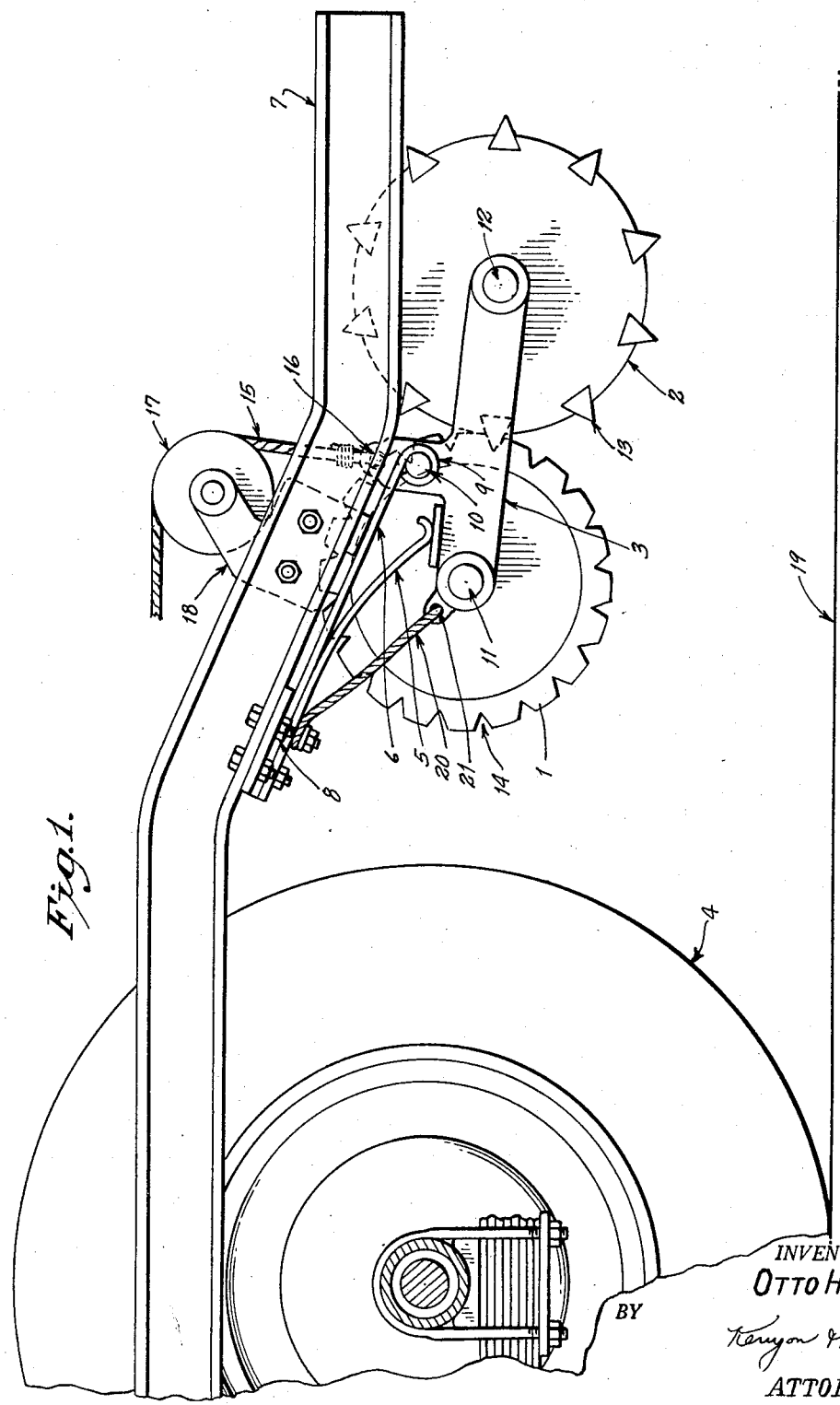
INVENTOR.
OTTO H. HAMM
BY
Kenyon & Kenyon
ATTORNEYS.

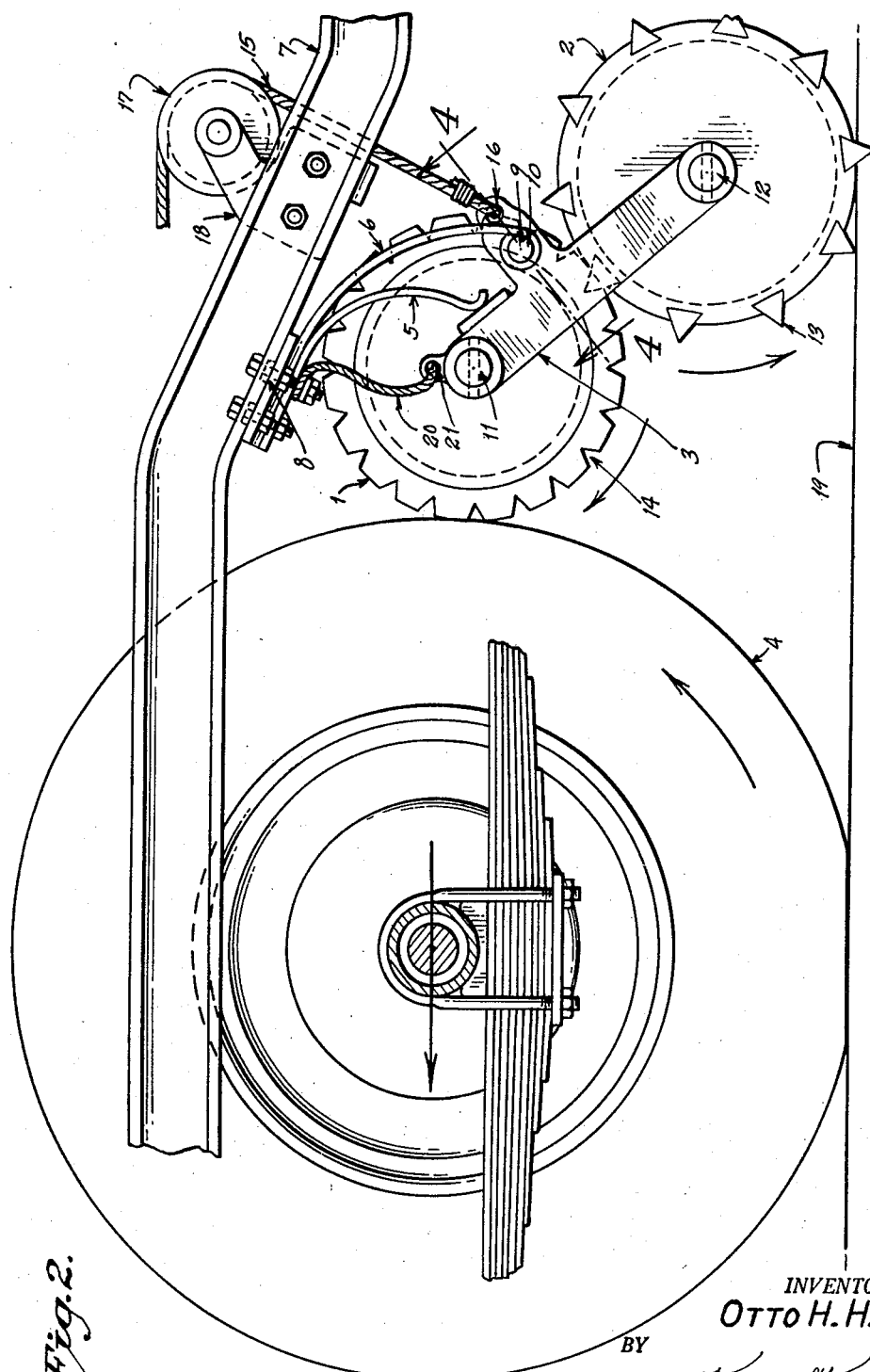

Nov. 10, 1959   O. H. HAMM   2,912,056
AUTOMOTIVE VEHICLE ANTI-SKID DEVICE
Filed Aug. 22, 1956   3 Sheets-Sheet 3
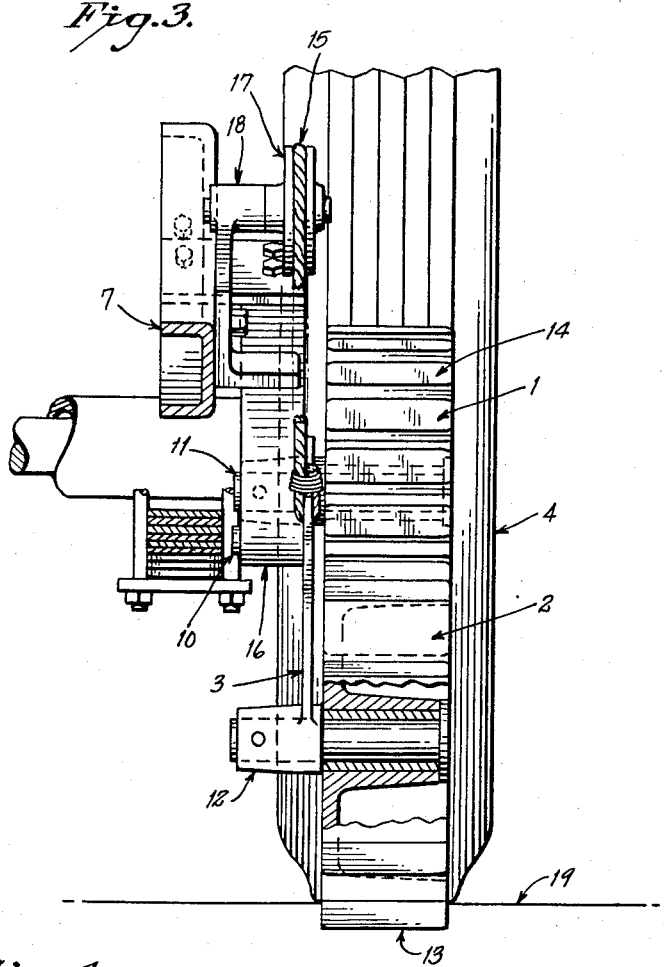
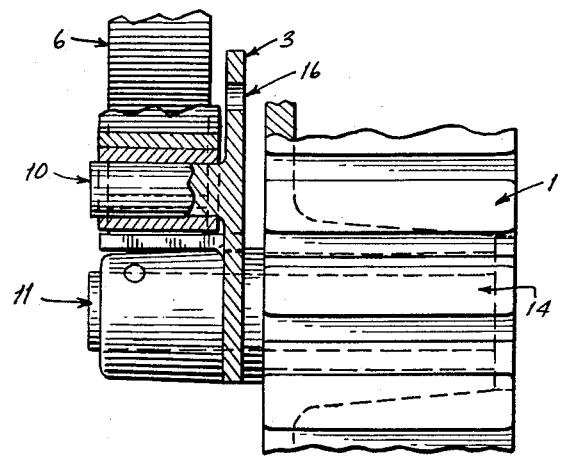
INVENTOR.
OTTO H. HAMM
BY
ATTORNEYS.

United States Patent Office 2,912,056
Patented Nov. 10, 1959

2,912,056

AUTOMOTIVE VEHICLE ANTI-SKID DEVICE

Otto H. Hamm, East Williston, N.Y.

Application August 22, 1956, Serial No. 605,595

6 Claims. (Cl. 180—15)

The present invention relates to anti-skid devices for automotive vehicles and particularly to an anti-skid device that is carried by the automotive vehicle in such a fashion that the operator of the vehicle may readily engage and disengage it without leaving his position in the vehicle.

More particularly, the invention is concerned with the above kind of device when it is of the type using an anti-skid wheel which can be raised and lowered and which when lowered is connected rotatively with the vehicle wheel to be protected from skidding and slipping. Prior art devices of this type have been designed without due regard for the space provided by a standard vehicle and available to receive the anti-skid wheel when it is raised because not needed. Also, they have not been constructed to avoid breakage, jamming or loss of contact with the road, when lowered for use, when the road is uneven. Roads usually contain bumps, ruts, and the like which must be considered if the anti-skid device is to operate under practical conditions. In many instances the prior art devices have been too complex to be practical.

In view of the foregoing it is one object of the present invention to provide simplicity and low cost in an improved anti-skid device which overcomes the complexity and other disadvantages of prior art devices.

More specifically it is an object of this invention to provide a practical anti-skid device which may be easily moved from its operative position to its inoperative position while the vehicle is moving or standing still.

Another object is to provide the described type of device in a form permitting the use of one of the devices for each of a multiplicity of the vehicle's wheels, while permitting independent riding action of each device as the vehicle wheels move up and down independently, due to the road condition, so that the anti-skid wheels of all of the devices continuously engage the road at all times.

A further object of this invention is to provide an anti-skid device which may be permanently attached to a vehicle in such a manner that it is out of the way when not needed; but which may be placed in operation almost immediately when needed, and which may, after the emergency has passed, be easily returned to its inoperative position where it is out of the way.

Yet another object of this invention is to provide a device for automotive vehicles which will supply positive forward and rearward traction, positive braking and non-skid movement while the vehicle is operating on ice, snow or other slippery surfaces.

A specific illustration of my invention is shown in the accompanying drawings, wherein:

Figure 1 is a side view showing the device in its inoperative position.

Figure 2 is a side view showing the device in its operative position.

Figure 3 is a rear view showing the device in its operative position.

Fig. 4 is a cross-section taken on line 4—4 of Figure 2.

The device embodying the present invention comprises two follower wheels mounted on a yoke, the follower wheels being located in alignment with each driving wheel of the vehicle and if desired in alignment with each non-driving wheel of the vehicle.

Referring now to the drawings the anti-skid device of the present invention comprises follower wheels 1, 2, mounted on a yoke 3. The follower wheels are located behind and in alignment with the vehicle wheel of the automotive vehicle, wheel 4 being representative of one of the driven wheels. When engaged with the vehicle wheels the device of the present invention provides positive forward and rearward traction, positive braking and, in general, non-skid protection. The device may also be mounted behind the non-driven or braking wheels in order to provide positive braking and non-skid movement.

The yoke 3, upon which the follower wheels 1, 2 are mounted, is a spring loaded member. Springs 5, 6 are mounted on the bottom portion of the frame 7 of the automotive vehicle. The connection is shown as being effected by a bolt and nut connection 8. These springs are formed so that they spring forcibly downwardly. The end of spring 5 that is not connected to the frame of the vehicle abuts against the top portion of yoke 3 and exerts a downward and forward force on yoke 3. The end of spring 6 that is not connected to the frame of the vehicle is bent over upon itself to form an eye 9. Spring 6 is attached to yoke 3 by looping the eye 9 over pin 10, which is rigidly mounted to the yoke 3. Spring 6 also exerts a downward and forward force on yoke 3. The diameter of the eye 9 is such that the pin 10, and therefore the yoke 3 can pivot within the eye 9.

The yoke 3 is also provided with shafts 11, 12 at both ends upon which the follower wheels 1, 2 are mounted. The follower wheels are mounted in a conventional manner so that they are free to rotate about the shafts 11, 12.

Follower wheel 2 is formed with a plurality of metal V-shaped anti-skid elements or cleats 13. These elements may be anything that act as fingers which dig into the road surface to give a good anti-skid action. These elements are spaced equidistant from one another along the outer circumference of follower wheel 2 and are located radially therefrom. The fingers taper outwardly and since they function as the anti-skid members they terminate in sharply pointed edges which are pressed into the surface over which the wheel rides, thereby providing the positive drive and anti-skid effect. These elements 13 may be formed of hardened steel of an abrasion-resisting nature.

The other follower wheel 1 is formed with a plurality of recesses 14 along the outer circumference. These recesses are spaced equidistant from one another along the outer circumference, their function being to engage the elements 13 on the follower wheel 2. The follower wheels may be formed with identical outer diameters. Since the length of the yoke 3, or the distance between the axes, is the same as the sum of the radii of the follower wheels, the outer surfaces of the follower wheels are in constant contact. As the follower wheels rotate the elements 13 are engaged by the recesses 14 in the manner of a pair of matched gears.

Movement of the device to and from its operative and inoperative positions is shown as being effected by a wire rope 15, which is fastened to yoke 3 through eyelet 16, and extends therefrom around a sheave 17 which is anchored by a bracket 18 to the frame 7 of the vehicle, the rope extending from there forwardly to a location handy to the driver of the vehicle. A lever or pulling device (not shown) may be provided at the driver's seat for pulling the rope 15 forwardly and latching it, while providing for instant release of the rope 15 so that the yoke 3 can spring downwardly and pivot in a clockwise direction about the pin 10. Because of the spring loading on the yoke 3, the device, when it is in its upper or inoperative position, will not rattle or interfere with the normal operation of the vehicle. The rope 15 may also be connected to similar devices provided for the other wheels of the vehicle. A Bowden cable may be substituted for the wire rope and thereby eliminate the sheave. The other devices and wheels are not illustrated because they would represent a duplication of what has already been described. Although one method of moving the device to and from its operative position has been described, it is to be understood that any suitable mechanical, electrical or hydraulic force may be utilized to raise or lower the device.

When the device is in its inoperative position, as shown in Figure 1, the release of rope 15 results in the device lowering into its operative position as shown in Figure 2. The device lowers into its operative position due to its weight and the downward force exerted by springs 5 and 6. As the device lowers it also moves forward until wheel 1 contacts vehicle wheel 4, then yoke 3 pivots within eye 9 of spring 6. The pivoting of yoke 3 and the force exerted by springs 5, 6 bring follower wheel 1 forcibly into contact with vehicle wheel 4, and follower wheel 2 into contact with the ground surface 19. When the device is in its operative position spring 6 continues to exert a downward and forward force on yoke 3 and on follower wheels 1, 2 to provide joint engagement of the follower wheels with the tread of the vehicle wheel and with the surface on which the vehicle is operating. The pivot mounting of yoke 3 to spring 6 at eye 9 permits rocker movement of yoke 3 and thereby maintains contact between follower wheel 1 and vehicle wheel 4, and between follower wheel 2 and the ground surface, due to the force exerted by spring 6, even though follower wheel 2 encounters obstacles, or uneven ground surfaces. Since each assembly is independent of assemblies associated with other wheels of the vehicle, each assembly will react to obstacles and other road irregularities without affecting the operation of other assemblies. In the operative position illustrated in Figure 2 springs 5 and 6 exert a counterclockwise force on the assembly forcing follower wheel 1 against vehicle wheel 4 in opposition to forces which tend to turn the assembly in a clockwise direction during forward motion of the vehicle.

When the assembly is lowered into its operative position (Figure 2) follower wheel 1 engages and is rotated by vehicle wheel 4 and follower wheel 1, in turn, engages and rotates follower wheel 2. As explained previously the assembly is constructed in such a manner that a contact is always maintained between the outer circumferences of follower wheels 1 and 2. As the follower wheels rotate, therefore, the radial V-shaped fingers on the outer circumference of follower wheel 2 are engaged by the radial recesses 14 on the outer circumference of follower wheel 1. In this manner slippage between follower wheels 1, 2 is eliminated.

If the vehicle is being operated on a slippery surface and more traction is desired the device is lowered into its operative position by releasing rope 15. As illustrated in Figure 2 if the vehicle is being operated to the left vehicle wheel 4 is rotating in a counterclockwise direction. Since follower wheel 1 is in contact with vehicle wheel 4 it is driven in a clockwise direction. Follower wheel 2, being in contact with follower wheel 1, is driven in a counterclockwise direction, and since it is being forced against the road surface by the force of gravity and by the force exerted by spring 6 through yoke 3, the metallic elements 13 on the outer circumference of follower wheel 2 bite into the road surface, whether such surface be ice, snow or other slippery materials and follower wheel 2 therefore exerts a positive tractive force to the left even though vehicle wheel 4 may tend to skid and slip on the slippery surface without causing lateral motion of the vehicle. If tractive force to the right or rearward is desired, the engagement of vehicle wheel 4 and follower wheels 1, 2, will cause said wheels to rotate in a direction opposite to that described above, resulting in a tractive force to the right or rearward. When the vehicle is being operated to the right or rearward, and the device is in its operative position, cable 20 prevents the entire assembly from rotating in a counter-clockwise direction beyond a predetermined position. The forces acting on follower wheels 1 and 2 when they are rotating in such a manner as to exert tractive force to the right or rearward tend to turn the entire assembly in a counterclockwise direction and without the restraining force exerted by cable 20 on yoke 3 the entire assembly would rotate to a position where follower wheel 2 would become disengaged from the ground surface. The cable 20 is connected to yoke 3 through eyelet 21, the other end of cable 20 being connected to one of the bolts connecting springs 5 and 6 to the frame of the vehicle.

When the device is in its operative position and braking force is applied to vehicle wheel 4, this force is in turn transmitted to follower wheels 1, 2. If the vehicle is being operated on a slippery surface vehicle wheel 4 would ordinarily skid or slide forward or sideways. This skidding or sliding on the part of vehicle wheel 4 is prevented, however, by the biting action of the metal fingers 13 on follower wheel 2 on the road surface 19. This braking action is provided whether the vehicle is moving forward, rearward or is standing still.

When the emergency has passed the entire assembly is raised to its inoperative position as shown in Figure 1 by pulling the rope 15 to the left. As the rope 15 exerts a lifting force on the assembly spring 5 rotates the assembly in a counter-clockwise direction thereby providing adequate clearance between follower wheel 2 and the ground surface. In the elevated position illustrated in Figure 2 spring 5 forces follower wheel 2 vertically against the underside of the vehicle and holds the entire assembly in a stationary position, to thus prevent vertical oscillation and thumping as the vehicle is operated over rough road surfaces. In other words, when the device is held in its inoperative position, the spring 5 prevents the yoke 3 from rocking in opposite directions and thus keeps the yoke 3 quiet and free from vibration when the device is inoperative and the vehicle is in operation.

The elements and cleats 13 are of triangular cross section and are removable end-wise from the grooves in the wheel 2 where they are mounted. Thus they can be removed, rotated and reinserted, in different positions, to give new gripping edges. The sharp, pointed, ends of these elements dig in to prevent side skidding. Any suitable means for holding the elements removably in place may be used.

It is to be noted that the tractive and braking force is transmitted between the wheel and the vehicle somewhat in the manner of a Hotchkins drive, to some extent. This spring mounting prevents the device from being damaged by hitting an obstruction.

Removal of the pin 10 and disconnection of the ropes 6 and 20 permits removal of the device in summertime, for example.

I claim:

1. An anti-skid device for an automotive vehicle provided with at least one road wheel comprising first and second follower wheels disposed behind and in planar alignment with said road wheel, the first follower wheel having a plurality of recesses formed about the periphery thereof, the second follower wheel having a plurality of anti-skid members radiating therefrom to engage said recesses on the first follower wheel whereby rotation of one follower wheel will effect rotation of the other follower wheel, a yoke, said follower wheels being rotatively mounted on opposite ends of said yoke, and a pin rigidly attached to said yoke and projecting perpendicularly therefrom, a cantilever spring, one end of said cantilever spring being attached to the frame of the automotive vehicle to extend rearwardly of said road wheel and the other end of said cantilever spring being bent over on itself to form an eye, said eye being looped over said pin whereby said yoke can pivot in a vertical plane in relation to said cantilever spring, and control means selectively to shift the follower wheels from an inopertaive position in which said follower wheels are disengaged from said road wheel to an opertaive position in which the first follower wheel bears against the road wheel and the second follower wheel bears against the surface on which the vehicle is operating, said cantilever spring in the operative position of said follower wheels simultaneously urging said first follower wheel into contact with said road wheel and said second follower wheel into contact with the surface on which the vehicle is operating.

2. An anti-skid device for an automotive vehicle provided with at least one road wheel comprising first and second follower wheels disposed behind and in planar alignment with said road wheel, the first follower wheel having a plurality of recesses formed about the periphery thereof, the second follower wheel having a plurality of anti-skid members radiating therefrom to engage said recesses on the first follower wheel whereby rotation of one follower wheel will effect rotation of the other follower wheel, a yoke, said follower wheels being rotatively mounted on opposite ends of said yoke, and a pin rigidly attached to said yoke and projecting perpendicularly therefrom, a cantilever spring, one end of said cantilever spring being attached to the frame of the automotive vehicle to extend rearwardly of said road wheel and the other end of said cantilever spring being bent over on itself to form an eye, said eye being looped over said pin whereby said yoke can pivot in a vertical plane in relation to said cantilever spring, and a second cantilever spring attached at one end to the frame of the vehicle, the other end of said secondary cantilever spring bearing against the upper portion of said yoke intermediate said first follower wheel and said pin whereby rotation of said yoke due to rotation of said first follower wheel by said road wheel is restrained, and control means selectively to shift the follower wheels from an inoperative position in which said follower wheels are disengaged from said road wheel to an operative position in which the first follower wheel bears against the road wheel and the second follower wheel bears against the surface on which the vehicle is operating, said cantilever spring in the operative position of said follower wheels simultaneously urging said first follower wheel into contact with said road wheel and said second follower wheel into contact with the surface on which the vehicle is operating.

3. An anti-skid device for an automotive vehicle provided with at least one road wheel comprising first and second follower wheels disposed behind and in planar alignment with said road wheel, the first follower wheel having a plurality of recesses formed about the periphery thereof, the second follower wheel having a plurality of anti-skid members radiating therefrom to engage said recesses on the first follower wheel whereby rotation of one follower wheel will effect rotation of the other follower wheel, a yoke, said follower wheels being rotatively mounted on opposite ends of said yoke, and a pin rigidly attached to said yoke and projecting perpendicularly therefrom, a cantilever spring, one end of said cantilever spring being attached to the frame of the automotive vehicle to extend rearwardly of said road wheel and the other end of said cantilever spring being bent over on itself to form an eye, said eye being looped over said pin whereby said yoke can pivot in a vertical plane in relation to said cantilever spring, and a second cantilever spring attached at one end to the frame of the vehicle, the other end of said secondary cantilever spring bearing against the upper portion of said yoke intermediate said first follower wheel and said pin whereby rotation of said yoke due to rotation of said first follower wheel by said road wheel is restrained, and a cable, said cable being attached at one end to the frame of the vehicle, the other end of said cable being attached to the end of said yoke bearing said first follower wheel, and control means selectively to shift the follower wheels from an inoperative position in which said follower wheels are disengaged from said road wheel to an operative position in which the first follower wheel bears against the road wheel and the second follower wheel bears against the surface on which the vehicle is operating, said means comprising a wire rope, one end of said wire rope being connected to said yoke and the other end of said wire rope terminating in a position convenient to the operator of the automotive vehicle, said cantilever spring in the operative position of said follower wheels simultaneously urging said first follower wheel into contact with said road wheel and said second follower wheel into contact with the surface on which the vehicle is operating.

4. A vehicle wheel anti-skid device including an anti-skid wheel for engaging the ground and an intermediate wheel for engaging the vehicle wheel and rotatively interconnecting it with said anti-skid wheel, a rocker arm on which both of said device's wheels are journaled, and a spring having one end adapted for connection to the vehicle and an opposite end to which said arm is pivotally connected at a location between the axes of said device's wheels, said spring extending rearwardly of said vehicle wheel and in the operating position of said anti-skid device adapted to simultaneously urge said intermediate wheel into contact with said vehicle wheel and said anti-skid wheel into contact with the ground on which the vehicle is operating, said arm rocking and moving bodily up and down with motion of the vehicle wheel over uneven ground when said device is in use.

5. A vehicle wheel anti-skid device including an anti-skid wheel for engaging the ground and an intermediate wheel for engaging the vehicle wheel and rotatively interconnecting it with said anti-skid wheel, a rocker arm on which both of said device's wheels are journaled, and a spring having one end adapted for rigid connection to the vehicle and an opposite end to which said arm is pivotally connected at a location between the axes of said device's wheels, said spring extending rearwardly of said vehicle wheel and in the operating position of said anti-skid device adapted to simultaneously urge said intermediate wheel into contact with said vehicle wheel and said anti-skid wheel into contact with the ground on which the vehicle is operating, said arm rocking and moving bodily up and down with motion of the vehicle wheel over uneven ground when said device is in use, said intermediate wheel bearing on said vehicle wheel, and spring means for restraining said arm from rotation due to said intermediate wheel's rotation by said vehicle wheel.

6. A vehicle wheel anti-skid device including an anti-skid wheel for engaging the ground and an intermediate wheel for engaging the vehicle wheel and rotatively interconnecting it with said anti-skid wheel, a rocker arm on which both of said device's wheels are journaled, and a cantilever spring having one end adapted for rigid connection to the vehicle and an opposite end to which said arm is pivotally connected at a location between the axes of said device's wheels, said spring extending rearwardly of said vehicle wheel and in the operating position of said anti-skid device adapted to simultaneously urge said intermediate wheel into contact with said vehicle wheel and said anti-skid wheel into contact with the ground on which the vehicle is operating, said arm rocking and moving bodily up and down with motion of the vehicle wheel over uneven ground when said device is in use, and means for lifting said arm against the force of said spring and releasable holding it lifted against said force, to render said device inoperative but ready for immediate use.

References Cited in the file of this patent

UNITED STATES PATENTS

| | | |
|---|---|---|
| 1,506,952 | Stackhouse | Sept. 2, 1924 |
| 1,889,241 | Gibson et al. | Nov. 29, 1932 |
| 2,168,440 | Dole | Aug. 8, 1939 |